United States Patent
Haruno et al.

(10) Patent No.: US 9,991,757 B2
(45) Date of Patent: Jun. 5, 2018

(54) THREE-PHASE ROTARY ELECTRIC MACHINE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Kentaro Haruno, Toyota (JP); Kazuki Asada, Anjo (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP)

(*) Notice: Subject to any disclaimer, the term of this patent is extended or adjusted under 35 U.S.C. 154(b) by 355 days.

(21) Appl. No.: 14/944,746

(22) Filed: Nov. 18, 2015

(65) Prior Publication Data
US 2016/0149457 A1   May 26, 2016

(30) Foreign Application Priority Data
Nov. 26, 2014   (JP) .................................. 2014-239025

(51) Int. Cl.
| | |
|---|---|
| H02K 3/38 | (2006.01) |
| H02K 3/50 | (2006.01) |
| H02K 5/22 | (2006.01) |
| H02K 15/12 | (2006.01) |

(52) U.S. Cl.
CPC .................. *H02K 3/38* (2013.01); *H02K 3/50* (2013.01); *H02K 5/225* (2013.01); *H02K 15/12* (2013.01)

(58) Field of Classification Search
CPC ............. H02K 5/225; H02K 3/38; H02K 3/50
USPC ...................................................... 310/43, 71
See application file for complete search history.

(56) References Cited

U.S. PATENT DOCUMENTS

| | | | | |
|---|---|---|---|---|
| 2003/0173842 A1* | 9/2003 | Kobayashi | ......... | H02K 15/0056 310/71 |
| 2016/0336829 A1* | 11/2016 | Haruno | ................... | H02K 3/522 |

FOREIGN PATENT DOCUMENTS

| | | |
|---|---|---|
| JP | 59-103554 U | 7/1984 |
| JP | 3-48344 U | 5/1991 |
| JP | 2013-062901 A | 4/2013 |
| JP | 2013-176183 A | 9/2013 |

(Continued)

OTHER PUBLICATIONS

Partial Translation of Notification of Reason(s) for Refusal dated Dec. 19, 2017 from the Japanese Patent Office in counterpart Japanese Application No. 2014-239025.

*Primary Examiner* — Jeremy Luks
(74) *Attorney, Agent, or Firm* — Sughrue Mion, PLLC

(57) ABSTRACT

Communication grooves for communicating an outer circumferential side with an inner circumferential side of a stator core are formed at a contact face, that contacts the stator core, of a three-phase terminal fixing member. Furthermore, a retention part deeper than the communication grooves is formed. When resin is injected, air between the stator core and a stationary mold and between the stator core and a movable mold is discharged to the outside through the communication grooves, and thus it is possible to suppress formation of voids between the stator core and the stationary mold and between the stator core and the movable mold. In addition, the resin expands by releasing its pressure at the retention part, and thus it is possible to suppress the resin from flowing to the outside through the communication grooves.

9 Claims, 3 Drawing Sheets

(56) References Cited

FOREIGN PATENT DOCUMENTS

| | | | |
|---|---|---|---|
| JP | 2015-133873 | A | 7/2015 |
| JP | 201667102 | A | 4/2016 |
| JP | 2016146694 | A * | 8/2016 |
| WO | 2015/107411 | A1 | 7/2015 |

* cited by examiner

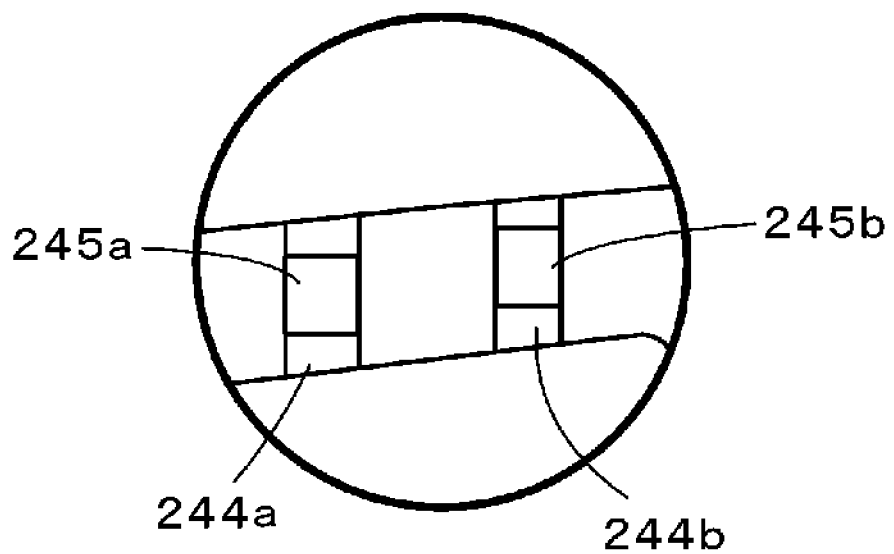
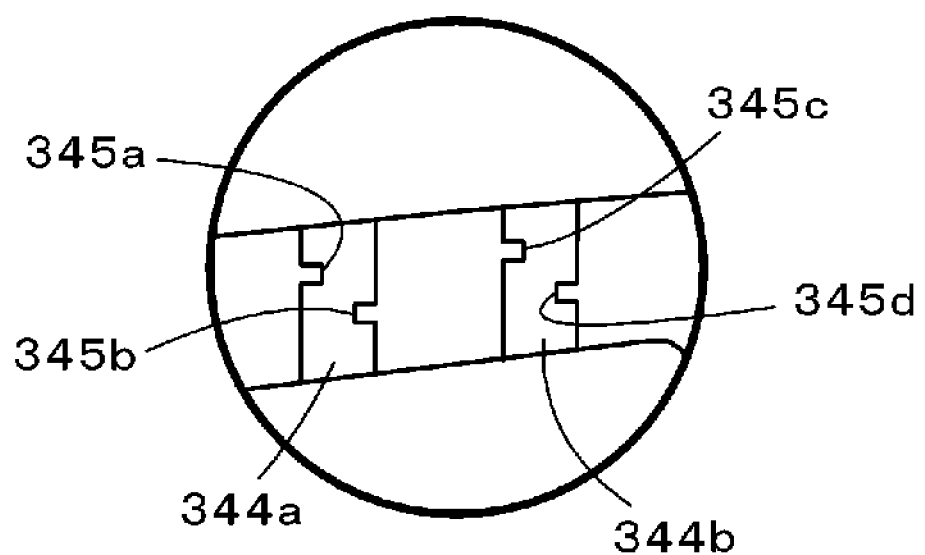

THREE-PHASE ROTARY ELECTRIC MACHINE

INCORPORATION BY REFERENCE

The disclosure of Japanese Patent Application No. 2014-239025 filed on Nov. 26, 2014 including the specification, drawings and abstract is incorporated herein by reference in its entirety.

BACKGROUND OF THE INVENTION

1. Field of the Invention

The invention relates to a three-phase rotary electric machine, and in particularly, to a three-phase rotary electric machine in which three-phase coils wound around a stator core are resin-molded.

2. Description of Related Art

Conventionally, as this kind of three-phase rotary electric machine, a solution is proposed in which a plurality of through-holes penetrated through the stator core in an axial direction are provided at an outer circumferential side of a coil end of the stator core (e.g., referring to Japanese Patent Application Publication No. 2013-176183 (JP 2013-176183 A)). In this three-phase rotary electric machine, riveting is carried out by inserting rivet pins in the plurality of through-holes, so that the stator core is configured integrally. During injection molding, residual air is discharged to the outside from the through-holes for rivet pins, thus formation of voids formed by the residual air is suppressed.

As for the injection molding, in order to reduce formation of the voids, generally resin is injected from a lower portion side of the stator core. Therefore, in the above three-phase rotary electric machine, when the lower portion of the stator core is filled with resin, the residual air is discharged to the outside via the through-holes for rivet pins. However, when an upper portion of the stator core is filled with resin, the through-holes for rivet pins are closed, so that it is difficult for the residual air to be discharged to the outside, thereby voids are formed. For this problem, it is also considered a solution in which air holes and/or grooves are formed to discharge the residual air to the outside, but in this case, the resin will flow to the outside to form foreign substance.

SUMMARY OF THE INVENTION

The invention provides a three-phase rotary electric machine discharging air to the outside to suppress formation of voids and to suppress resin from flowing to the outside when the resin is injected.

According to an aspect of the invention, a three-phase rotary electric machine includes a stator in which a three-phase terminal fixing member for fixing three-phase terminals from three-phase coils wound around a stator core to an axial end of the stator core and the three-phase coils are resin-molded together, wherein the three-phase terminal fixing member is formed, at a fixing member contact part that contacts the stator core, with at least one communication groove for communicating an inner circumferential side with an outer circumferential side of the stator core, and a hindrance structure for hindering the resin from flowing to the outside is formed in the communication groove.

In the three-phase rotary electric machine according to the aspect, at least one communication groove for communicating the inner circumferential side with the outer circumferential side of the stator core is formed at the fixing member contact part, that contacts the stator core, of the three-phase terminal fixing member. By forming the communication groove, residual air can be discharged to the outside when the resin is injected, so as to suppress formation of the voids. In addition, in the three-phase rotary electric machine according to the aspect, in the communication groove, a hindrance structure for hindering the resin from flowing to the outside is formed in the communication groove. Therefore, it is possible to suppress the resin from flowing to the outside via the communication groove.

In the three-phase rotary electric machine according to the above aspect, the hindrance structure may also be formed as a retention part that retains the resin by widening a portion of the communication groove. Resin tends to expand when its pressure is released, hence when the resin arrives at the retention part, its pressure is released to a certain extent so that it expands and is retained, thus its outflow to the outside is suppressed.

In the three-phase rotary electric machine according to an aspect in which the hindrance structure is formed as the retention part, the retention part may also be formed to be widened from the communication groove in a circumferential direction of the stator core. By doing so, it is possible to form a retention part larger in the widthwise direction (the circumferential direction of the stator core), and it is possible to suppress the resin from flowing to the outside. In this case, it may also be such that two or more communication grooves are formed at the fixing member contact part, and the retention part is formed to communicate at least two of the communication grooves. By doing so, it is possible to form a larger retention part, and the resin can be suppressed from flowing to the outside.

In addition, in the three-phase rotary electric machine according to an aspect in which the hindrance structure is formed as the retention part, the retention part may also be formed to be widened in an axial direction of the stator core. By doing so, it is possible to form a retention part larger in the depth direction (the axial direction of the stator core), and the resin can be suppressed from flowing to the outside.

In the three-phase rotary electric machine according to the above aspect, the hindrance structure may be formed either as a protrusion protruded inwardly from at least one position at an inner side of the communication groove or two protrusions protruded inwardly from staggered positions on two side surfaces at the inner side of the communication groove. By such protrusion(s), the resin can be suppressed from flowing to the outside.

BRIEF DESCRIPTION OF THE DRAWINGS

Features, advantages, and technical and industrial significance of exemplary embodiment of the invention will be described below with reference to the accompanying drawings, in which like numerals denote like elements, and wherein:

FIG. 4 is an explanatory diagram illustrating communication grooves 244a, 244b in a modified example of the invention; and FIG. 5 is an explanatory diagram illustrating communication grooves 344a, 344b in a modified example of the invention.

DETAILED DESCRIPTION OF EMBODIMENTS

Hereinafter, modes for carrying out the invention will be described by way of embodiments.

Figure 1:
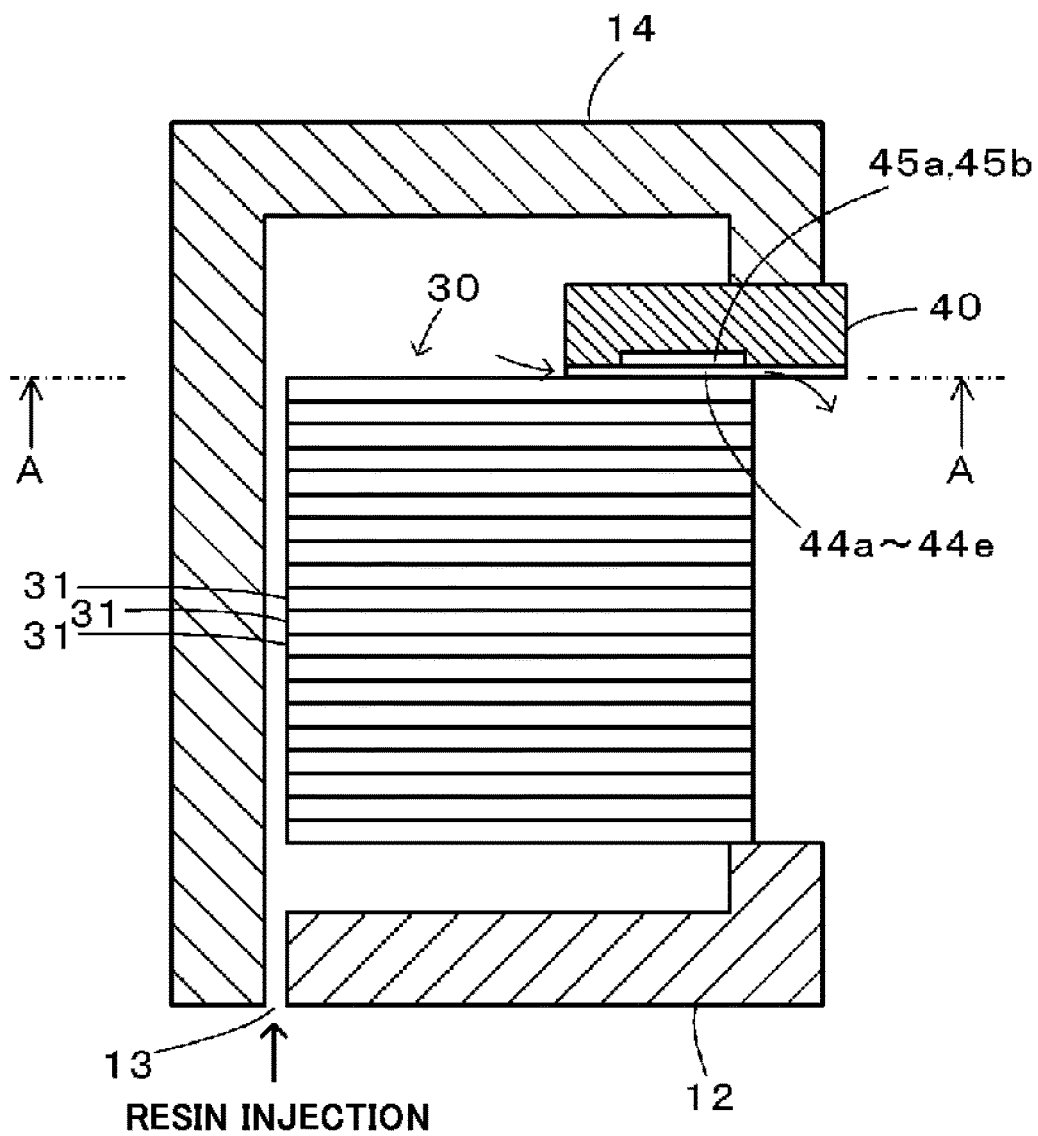
FIG. 1 is an explanatory diagram schematically illustrating the state in which resin is injected into a stator core 30 of a three-phase rotary electric machine according to an embodiment of the invention.
Figure 2:
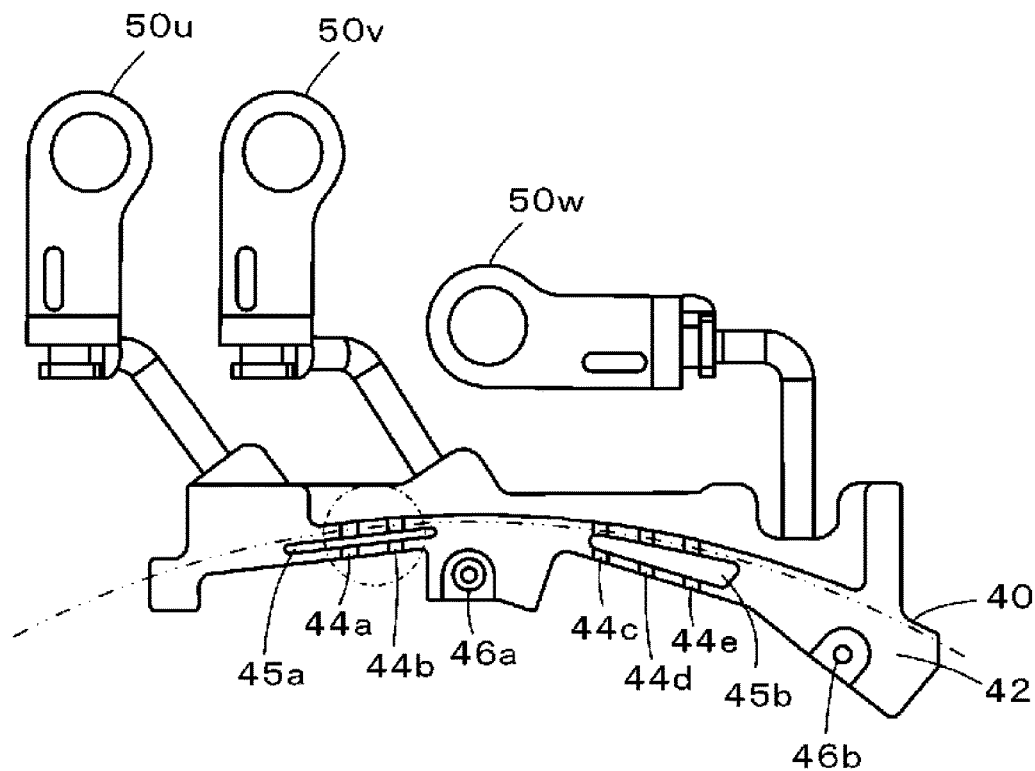
FIG. 2 is an explanatory diagram illustrating the shape of a contact face side (A-A face in FIG. 1), that contacts the stator core 30, of a three-phase terminal fixing member 40.

FIG. 1 is an explanatory diagram illustrating the state in which resin is injected into a stator core 30 of a three-phase rotary electric machine according to an embodiment of the invention, and FIG. 2 is an explanatory diagram illustrating the shape of a contact face side (A-A face in FIG. 1), that contacts the stator core 30, of a three-phase terminal fixing member 40. In addition, in FIG. 2, an outer circumference of the stator core 30 is indicated by a double dot dash line.

The stator core 30 of the embodiment is constructed by stacking a plurality of stator members 31 each obtained by forming an electromagnetic steel plate in an annular shape by punching or the like, and three-phase coils (not shown in the figures) are wound by centralized winding or distributed winding around teeth (not shown) formed by slots (not shown). A three-phase terminal fixing member 40 is attached to an upper portion of the stator core 30. The three-phase terminal fixing member 40 is used to lead three lead terminals 50u, 50v, 50w of U-phase, V-phase and W-phase from the three-phase coils to the outside.

As shown in FIG. 1 and FIG. 2, the three-phase terminal fixing member 40 is formed, at a contact face (bottom face) 42 that contacts the stator core 30, with five communication grooves 44a to 44e for communicating an outer circumferential side with an inner circumferential side of the stator core 30. At the contact face 42, a retention part 45a for communicating two communication grooves 44a, 44b and being deeper than the two communication grooves 44a, 44b is formed. In addition, at the contact face 42, a retention part 45b for communicating three communication grooves 44c to 44e and being deeper than the three communication grooves 44c to 44e is formed. Furthermore, at the contact face 42, two protrusions 46a and 46b for positioning when the three-phase terminal fixing member 40 is attached to the stator core 30 are formed at positions spaced away from the five communication grooves 44a to 44e. In addition, the three-phase terminal fixing member 40 is positioned by fitting the protrusions 46a, 46b into recesses for positioning (not shown) formed in the stator core 30.

Resin injection is carried out by placing the stator core 30 on a stationary mold 12, installing a movable mold 14, and injecting resin from a resin injection port 13 formed by a gap, that is located at the lowest part, between the stationary mold 12 and the movable mold 14. At this time, resin is firstly injected in between the stator core 30 and the stationary mold 12 below the stator core 30. Air between the stator core 30 and the stationary mold 12 is pressed by the injected resin to flow through the gap between the stator core 30 and the movable mold 14 to a space between the stator core 30 and an upper part of the movable mold 14. Subsequently, the air is discharged to the outside at the outer circumferential side of the stator core 30 via the five communication grooves 44a to 44e (referring to the arrows in FIG. 1). If injection of resin in between the stator core 30 and the stationary mold 12 is completed, the resin will be injected between the stator core 30 and the upper part of the movable mold 14 via the gap between the stator core 30 and the movable mold 14. At this time, the air between the stator core 30 and the movable mold 14 is also pressed by the injected resin to be discharged to the outside at the outer circumferential side of the stator core 30 via the five communication grooves 44a to 44e. In this way, by forming at the contact face 42 of the three-phase terminal fixing member 40 the five communication grooves 44a to 44e for communicating the outer circumferential side with the inner circumferential side of the stator core 30, the air between the stator core 30 and the movable mold 14 can be discharged to the outside at the outer circumferential side of the stator core 30 via the five communication grooves 44a to 44e. As a result, it is possible to suppress formation of voids caused by air remaining between the stator 30 and the movable mold 14.

When injection of resin in between the stator core 30 and the movable mold 14 is substantially completed, the resin will also be injected into the five communication grooves 44a to 44e. If the resin injected into the two communication grooves 44a, 44b arrives at the retention part 45a formed to communicate the two communication grooves 44a, 44b, its pressure is released so that it expands, and is suppressed from flowing to the outside. Similarly, if the resin injected into the three communication grooves 44c to 44e arrives at the retention part 45b formed to communicate the three communication grooves 44c to 44e, its pressure is released so that it expands and is suppressed from flowing to the outside.

In the three-phase rotary electric machine according to the above described embodiment, five communication grooves 44a to 44e for communicating the outer circumferential side with the inner circumferential side of the stator core 30 are formed at the contact face 42 of the three-phase terminal fixing member 40. Also, the retention part 45a for respectively communicating the two communication grooves 44a, 44b and/or communicating the three communication grooves 44c to 44e and being deeper than the five communication grooves 44a to 44e is formed. Hence, when the stationary mold 12 and the movable mold 14 are installed and resin is injected, it is possible to suppress the resin from flowing to the outside from the five communication grooves 44a to 44e. In addition, even when the resin is flowed to the outside from the five communication grooves 44a to 44e, it is possible to reduce the amount of foreign substance outside of the stator core 30. As compared with the conventional art, it is possible to suppress formation of voids caused by the air remaining between the stator core 30 and the stationary mold 12 and/or between the stator core 30 and the movable mold 14.

Figure 3:
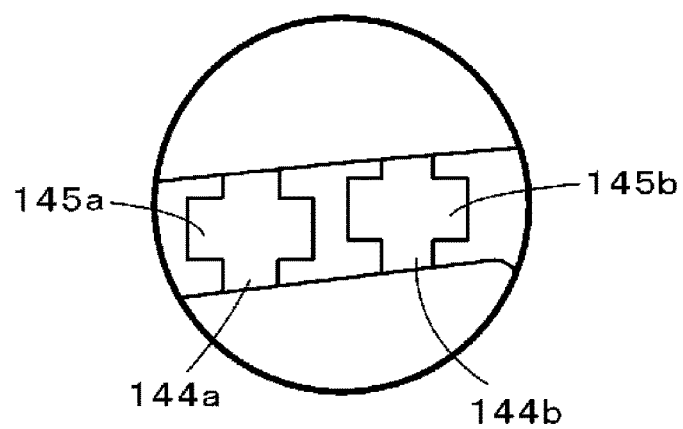
FIG. 3 is an explanatory diagram illustrating communication grooves 144a, 144b in a modified example of the invention.

In the three-phase rotary electric machine according to the embodiment, the retention part 45a for respectively communicating the two communication grooves 44a, 44b and/or communicating the three communication grooves 44c to 44e and being deeper than the five communication grooves 44a to 44e is formed. However, the retention part may be formed neither to respectively communicate the two communication grooves 44a, 44b and/or communicate the three communication grooves 44c to 44e, nor to be deeper than the five communication grooves 44a to 44e. For example, it may be case as in the modified example in FIG. 3. FIG. 3 shows the same portion as that concerning the two communication grooves 44a, 44b indicated by a single dot dash circle in FIG. 2. In this modified example, two retention parts 145a, 145b are formed so as to be widened in the circumferential direction of the stator core 30 at the same depth as the two communication grooves 144a, 144b, and not to communicate the two communication grooves 144a, 144b.

In this case, the same effect as in the embodiment can be achieved. In addition, it may be the case as in the modified example in FIG. 4. As with FIG. 3, FIG. 4 shows the same portion as that concerning the two communication grooves 44a, 44b indicated by the singe dot dash circle in FIG. 2. In this modified example, two retention parts 245a, 245b are formed so as to have the same width as the two communication grooves 244a, 244b but are deeper than the communication grooves in the axial direction of the stator core 30. In this case, the same effect as in the embodiment can be achieved.

In the three-phase rotary electric machine according to the embodiment, the retention part 45a for respectively communicating the two communication grooves 44a, 44b and/or communicating the three communication grooves 44c to 44e and being deeper than the five communication grooves 44a to 44e is formed. However, since it will suffice to be capable of suppressing the resin from flowing to the outside from the five communication grooves 44a to 44e, it is possible to form in the five communication grooves 44a to 44e a structure for hindering the resin from flowing to the outside. For example, it may be the case as in the modified example in FIG. 5. FIG. 5 shows the same portion as that concerning the two communication grooves 44a, 44b indicated by the single dot dash circle in FIG. 2. In this modified example, protrusions 345a to 345d are formed at two communication grooves 344a, 344b respectively to be protruded inwardly from staggered positions on two side surfaces at the inner side of the communication grooves. The protrusions 345a to 345d hinder the flow of the resin. Therefore, it is possible to suppress the resin from flowing to the outside from the two communication grooves 344a, 344b. In addition, in this modified example, two protrusions protruded inwardly may be formed at staggered positions on the two side surfaces at the inner side of one of the communication grooves. However, there may be either only one protrusion or more than two protrusions formed in one of the communication grooves. In addition, the protrusion(s) may be formed on the bottom surface (or top surface), instead of the side surfaces, of the communication groove(s).

In the three-phase rotary electric machine according to the embodiment, five communication grooves 44a to 44e are formed at the contact face 42 of the three-phase terminal fixing member 40. However, there may be either less or more than five communication grooves formed at the contact face 42 of the three-phase terminal fixing member 40. In addition, retention part(s) may be formed for either all or part of the communication grooves.

Modes for carrying out the invention have been described above by way of the embodiments thereof, nevertheless the invention is naturally by no means limited to such embodiments, and can be carried out in various ways without departing from the scope of the gist of the invention.

The invention can be applied in manufacturing industry of three-phase rotary electric machines, and the like.

What is claimed is:

1. A three-phase rotary electric machine, comprising:
a stator in which a three-phase terminal fixing member for fixing three-phase terminals from three-phase coils wound around a stator core to an axial end of the stator core and the three-phase coils are resin-molded together,
wherein the three-phase terminal fixing member is formed, at a fixing member contact part that contacts the stator core, with at least one communication groove for communicating an inner circumferential side with an outer circumferential side of the stator core, and
wherein a hindrance structure for hindering the resin from flowing to the outside is formed in the communication groove.

2. The three-phase rotary electric machine according to claim 1, wherein the hindrance structure is formed as a retention part that retains the resin by widening a portion of the communication groove.

3. The three-phase rotary electric machine according to claim 2, wherein the retention part is formed to be widened from the communication groove in a circumferential direction of the stator core.

4. The three-phase rotary electric machine according to claim 3, wherein two or more communication grooves are formed at the fixing member contact part, and the retention part is formed to communicate at least two of the communication grooves.

5. The three-phase rotary electric machine according to claim 2, wherein the retention part is formed to be widened from the communication groove in an axial direction of the stator core.

6. The three-phase rotary electric machine according to claim 3, wherein the retention part is formed to be widened from the communication groove in an axial direction of the stator core.

7. The three-phase rotary electric machine according to claim 4, wherein the retention part is formed to be widened from the communication groove in an axial direction of the stator core.

8. The three-phase rotary electric machine according to claim 1, wherein the hindrance structure is formed as a protrusion protruded inwardly from at least one position at an inner side of the communication groove.

9. The three-phase rotary electric machine according to claim 1, wherein the hindrance structure is formed as two protrusions protruded inwardly from staggered positions on two side surfaces at an inner side of the communication groove.

* * * * *